United States Patent
Ramirez et al.

(10) Patent No.: US 9,394,408 B2
(45) Date of Patent: Jul. 19, 2016

(54) CONTROLLED POLYMERIZATION OF FUNCTIONAL FLUORINATED POLYHEDRAL OLIGOMERIC SILSESQUIOXANE MONOMERS

(71) Applicant: The United States of America as Represented by the Secretary of the Air Force, Wright-Patterson AFB, OH (US)

(72) Inventors: Sean M. Ramirez, Lancaster, CA (US); Joseph M. Mabry, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/013,600

(22) Filed: Aug. 29, 2013

(65) Prior Publication Data

US 2015/0065674 A1 Mar. 5, 2015

(51) Int. Cl.
C08G 77/24 (2006.01)
C08G 77/04 (2006.01)

(52) U.S. Cl.
CPC ............. *C08G 77/24* (2013.01); *C08G 77/045* (2013.01)

(58) Field of Classification Search
CPC ............................ C08G 77/24; C08G 77/045
See application file for complete search history.

(56) References Cited

U.S. PATENT DOCUMENTS

| | | | |
|---|---|---|---|
| 2,687,424 A | 8/1954 | Sommer | |
| 3,382,279 A | 5/1968 | Hans Niederprum et al. | |
| 3,465,017 A | 9/1969 | Coutant | |
| 4,709,008 A | 11/1987 | Shimp | |
| 4,774,028 A | 9/1988 | Imai et al. | |
| 5,258,534 A | 11/1993 | Larson et al. | |
| 5,283,348 A | 2/1994 | Bank | |
| 5,284,968 A | 2/1994 | Craig, Jr. | |
| 5,629,394 A | 5/1997 | Cheradame et al. | |
| 5,912,377 A | 6/1999 | Hall et al. | |
| 6,057,402 A | 5/2000 | Zhou et al. | |
| 6,217,943 B1 | 4/2001 | Hall et al. | |
| 6,489,380 B1 | 12/2002 | Zhou et al. | |
| 6,716,919 B2 | 4/2004 | Lichtenhan et al. | |
| 6,767,930 B1 | 7/2004 | Svejda et al. | |
| 6,770,724 B1 | 8/2004 | Lichtenhan et al. | |
| 6,844,379 B2 | 1/2005 | Zhou et al. | |
| 6,911,518 B2 | 6/2005 | Lichtenhan | |
| 7,053,167 B2 | 5/2006 | Ito et al. | |
| 7,157,117 B2 | 1/2007 | Mikhael | |
| 7,193,015 B1 * | 3/2007 | Mabry et al. | 525/101 |
| 7,291,747 B2 | 11/2007 | Oikawa et al. | |
| 7,332,822 B2 | 2/2008 | Basheer | |
| 7,790,841 B1 | 9/2010 | Yandek et al. | |
| 7,868,112 B2 * | 1/2011 | Oikawa et al. | 526/279 |
| 7,897,667 B2 | 3/2011 | Mabry et al. | |
| 8,058,380 B1 | 11/2011 | Vij et al. | |
| 8,276,664 B2 | 10/2012 | Gupta | |
| 8,557,329 B2 | 10/2013 | Dai et al. | |
| 8,565,892 B2 | 10/2013 | Nayfach-Battilana | |
| 8,580,027 B1 | 11/2013 | Campos et al. | |
| 8,741,432 B1 | 6/2014 | Campos et al. | |
| 9,052,653 B2 | 6/2015 | Moorlag | |
| 2001/0016616 A1 | 8/2001 | Yeager et al. | |
| 2004/0067339 A1 | 4/2004 | Gandon | |
| 2004/0068075 A1 * | 4/2004 | Lichtenhan et al. | 528/15 |
| 2005/0009982 A1 | 1/2005 | Inagaki et al. | |
| 2006/0194068 A1 | 8/2006 | Katoh et al. | |
| 2006/0286555 A1 | 12/2006 | Van Beuningen | |
| 2007/0173657 A1 | 7/2007 | Chen et al. | |
| 2008/0199805 A1 * | 8/2008 | Rushkin et al. | 430/270.1 |
| 2008/0221262 A1 * | 9/2008 | Mabry et al. | 524/588 |
| 2009/0069508 A1 | 3/2009 | Poe et al. | |
| 2009/0176097 A1 | 7/2009 | Brown et al. | |
| 2010/0035070 A1 * | 2/2010 | Moorlag et al. | 428/447 |
| 2010/0063244 A1 | 3/2010 | Poe et al. | |
| 2010/0068168 A1 | 3/2010 | Song et al. | |
| 2010/0098761 A1 | 4/2010 | Song et al. | |
| 2010/0159011 A1 | 6/2010 | Lian et al. | |
| 2010/0280561 A1 | 11/2010 | Song et al. | |
| 2010/0316842 A1 | 12/2010 | Tuteja | |
| 2011/0229706 A1 | 9/2011 | Epstein | |
| 2011/0283778 A1 | 11/2011 | Angelescu | |
| 2012/0000853 A1 | 1/2012 | Tuteja et al. | |
| 2012/0015191 A1 | 1/2012 | Treadway | |
| 2012/0190532 A1 | 7/2012 | Celiker et al. | |
| 2012/0214269 A1 | 8/2012 | Harding | |

FOREIGN PATENT DOCUMENTS

CN 102659827 9/2012

OTHER PUBLICATIONS

Sean M. Ramirez, "Synthesis and Free Radical Polymerization of Fluorinated Polyhedral Oligomeric Silsesquioxane (F-POSS) Macromers: Precursors for Low Surface Energy Materials," Presentation to the Chemistry Department of the Air Force Academy, Colorado Springs, Colorado, Apr. 12, 2012.
E. Girard et al., "Direct synthesis of vinylidene fluoride-based amphiphilic diblock copolymers by RAFT/MADIX polymerization," ACS Macro Lett., vol. 1 (2012) 270-274.
Moad et al., "Some recent developments in RAFT polymerization," ACS Symp. Ser., vol. 1100 (2012) 243-258.
Kumpfer et al., "Directed self-assembly of metallosupramolecular polymers at the polymer-polymer interface," ACS Macro. Lett., vol. 1 (2012) 882-887.
Ramirez et al., "Functionalization of fluoroalkyl polyhedral oligomeric silsesquioxanes (F-POSS)," ACS Symp. Ser., vol. 1106 (2012) 95-109.
Isemura et al., "Dichloropentafluoropropanes as solvents for size exclusion chromatography," Chromatogr. A., vol. 1026 (2004) 109-116.
United States Patent Office, "Non-Final Office Action in U.S. Appl. No. 13/210,915," mailed Jun. 11, 2014, 6 pages total.

(Continued)

*Primary Examiner* — Margaret Moore
(74) *Attorney, Agent, or Firm* — AFMCLO/JAZ; Chastity Whitaker

(57) ABSTRACT

A polymer comprising polymerized units of norbornene fluoroalkyl polyhedral oligomeric silsesquioxane. According to aspects of the present invention, the polymer may be norbornene fluoroalkyl polyhedral oligomeric silsesquioxane. Still other aspects of the present invention may include a polymerized unit of an alkene chain derived from a cyclic alkene.

12 Claims, 12 Drawing Sheets

(56) References Cited

OTHER PUBLICATIONS

B. Seurer et al.., "Influences of POSS peripheral, architecture, and spacer group on phenylethynphthalimide reactions," Polymer Preprints, vol. 50 (2009) 820-821.
United States Patent Office, "Final Office Action in U.S. Appl. No. 13/624,151," mailed May 30, 2014, 11 pages total.
McCormick et al., "Aqueous Raft polymerization: recent developments in synthesis of functional water-soluble (co)polymers with controlled structures," ACC Chem. Res., vol. 37 (2004) 312-325.
Wang et al, "Hepta(3,3,3-trifluoropropyl)Polyhedral Oligomeric Silsesquioxane-capped Poly(N-isopropylacrylamide) Telechelics: synthesis and behavior of physical hydrogels," ACS Appl. Mater. Interfaces., vol. 3 (2011) 898-909.
Moad et al., "Toward living radical polymerization," Acc. Chem. Res., vol. 41 (2008) 1133-1142.
Rameriz et al., "Incompletely condensed fluoroalkyl silsesquioxanes and derivatives: precursors of low surface energy materials," JACS, vol. 133 (2011) 20084-20087.
Zeng et al., "Nanostructures and surface hydrophobicity of epoxy thermosets containing hepta(3,3,3-trifluoropropyl) polyhedral oligomeric silsesquioxane-capped poly(hydroxyether of bisphenol A) telechelics," Colloid. Interface Sci., vol. 363 (2011) 250-260.
Mayadunne et al., "Living radical polymerization with reversible addition-fragmentation chain transfer (RAFT polymerization) using dithiocarbamates as chain transfer agents," Macromol., vol. 32 (1999) 6977-6980.
Goto et al., "Mechanism and kinetics of RAFT-based living radical polymerizations of styrene and methyl methacrylate," Macromol., vol. 34 (2001) 402-409.
Tsujii et al., "Mechanism and kinetics of RAFT-mediated graft polymerization of styrene on a solid surface," Macromol., vol. 34 (2001) 8872-8878.
Thomas et al., "Kinetics and molecular weight control of the polymerization of acrylamide via RAFT," Macromol., vol. 37 (2004) 8941-8950.
Zhang et al., "Synthesis via RAFT polymerization of tadpole-shaped organic/inorganic hybrid poly(acrylic acid) containing polyhedral oligomeric silsesquioxane (POSS) and their self-assembly in water," Macromol., vol. 42 (2009) 2563-2569.
Tan et al., "Tailoring micelle formation and gelation in (PEG-P(MA-POSS)) amphiphilic hybrid block copolymers," Macromol., vol. 44 (2011) 622-631.
Lu et al., "L-proline functionalized polymers prepared by RAFT polymerization and their assemblies as supported organocatalysts," Macromol., vol. 44 (2011) 7233-7241.
Stamenovic et al., "Norbornenyl-based RAFT agents for the preparation of functional polymers via thiol-ene chemistry," Macromol., vol. 44 (2011) 5619-5630.
Cheng et al., "Phosphonium-containing ABA triblock copolymers: controlled free radical polymerization of phosphonium ionic liquids," Macromol., vol. 44 (2011) 6509-6517.
Zeng et al., "Rapid deswelling and reswelling response of poly(N-isopropylacrylamide) hydrogels via formation of interpenetrating polymer netowkrs with polyhedral oligomeric silsesquioxane-capped polyethylene oxide) amphiphilic telechelics," J. Phys. Chem. B, vol. 113 (2009) 11831-11840.
Destarac et al., "On the critical role of RAFT agent design in reversible additional-fragmentation chain transfer (RAFT) polymerization," Polym. Rev., vol. 51 (2011) 163-187.
Roghani-Mamaqani et al., "In situ controlled radical polymerization: a review on synthesis of well-defined nanocomposites," Polym. Rev., vol. 52 (2012) 142-188.
Zeng et al., "Organic-inorganic hybrid hydrogels involving poly(N-isopropylacrylamide) and polyhedral oligomeric silsesquioxane: preparation and rapid thermoresponsive properties," J. Polym. Sci., Part B: Polym. Phys., vol. 47 (2009) 504-516.
Iacono et al., "Synthesis, characterization, and properties of chain terminated polyhedral oligomeric silsesquioxane-functionalized perfluorocyclobutyl aryl ether copolymers," Polymer, vol. 48 (2007) 4637-4645.
Gregory et al., "Complex polymer architectures via RAFT polymerization: from fundamental process to extending the scope using click chemistry and nature's building blocks," Prog. Polym. Sci., vol. 37 (2012) 38-105.
Braunecker et al., "Controlled/living radical polymerization: features, developments, and perspectives," Prog. Polym. Sci., vol. 32 (2007) 93-146.
Alberto Fina et al., "POSS-based hybrids by melt/reactive blending," Journal of Materials Chemistry, vol. 20, (2010) pp. 9297-9305.
Brian M. Moore et al., "Asymmetric aryl polyhedral oligomeric silsesquioxanes (ArPOSS) with enhanced solubility," Journal of Organometallic Chemistry, vol. 696 (2011) pp. 2676-2680.
P.D. Lickiss and F. Rataboul, Chapter 1: "Fully condensed polyhedral oligosilsesquioxanes (POSS): From synthesis to application," Adv. Organomet. Chem. vol. 57 (2008) pp. 1-116.
J. D. Lichtenhan et al., "Linear hybrid polymer building blocks: methacrylate-functionalized polyhedral oligomeric silsesquioxane monomers and polymers," Macromol. vol. 28 (1995) 8435-8437.
S.D. Rosenberg et al., "Preparation of Some Arylchlorosilanes with Arylmagnesium Chlorides" Journal Organomet. Chemistry vol. 22 (1957) pp. 1606-1607.
P. Iyer and M. R. Coleman, "Thermal and Mechanical Properties of Blended Polyimide and Amine-Functionalized Poly(orthosiloxane) Composites," Journal of Applied Polymer Science, vol. 108 (2008) pp. 2691-2699.
G. R. Yandek et al., "Effects of Peripheral Architecture on the Properties of Aryl Polyhedral Oligomeric Silsesquioxanes," J. Phys. Chem. vol. 116, (2012) pp. 16755-16765.
S. S. Chhatre et al., "Fluoroalkylated Silicon-Containing Surfaces—Estimation of Solid-Surface Energy," Appl. Mater. Interfaces. vol. 2 (2010) 3544-3554.
F. J. Feher et al., "A new route to heterosilsesquioxane frameworks," Angew. Chem., Int. Ed. vol. 37 (1998) 2663-2667.
F. J. Feher et al., "A new route to incompletely-condensed silsesquioxanes: acid-mediated cleavage and rearrangement of (c-C6H11)6Si6O9 to C2-[(c-C6H11)6Si6O8X2]," Chem. Commun. (1999) 1705-1706.
F. J. Feher et al., "A new route to incompletely-condensed silsesquioxanes: base-mediated cleavage of polyhedral oligosilsesquioxanes," Chem. Commun. (1999) 2309-2310.
F. J. Feher, "Controlled cleavage of R8Si8O12 frameworks: a revolutionary new method for manufacturing precursors to hybrid inorganic-organic materials," Chem. Commun. (1998) 399-400.
A. Tuteja et al., "Designing superoleophobic surfaces," Science. vol. 318 (2007) 1618-1622.
S. H. Phillips et al., "Developments in nanoscience: polyhedral oligomeric silsesquioxane (POSS)-polymers," Current Opinion in Solid State and Materials Science. vol. 8 (2004) 21-29.
W. Choi et al., "Fabrics with tunable oleophobicity," Adv. Mater. vol. 21 (2009) 2190-2195.
S. T. Iacono et al., "Facile synthesis of hydrophobic fluoroalkyl functionalized silsesquioxane nanostructures," Chem. Commun. (2007) 4992-4994.
J. M. Mabry et al., "Fluorinated polyhedral oliomeric silsesquioxanes (F-POSS)," Angew. Chem., Int. Ed. vol. 47 (2008) 4137-4140.
E. G. Shockey et al., "Functionalized polyhedral oligosilsesquioxane (POSS) macromers: new graftable POSS hydride, POSS α-olefin, POSS epoxy, and POSS chlorosilane macromers and POSS-siloxane triblocks," Appl. Organomet. Chem. vol. 13 (1999) 311-327.
R. Duchateau "Incompletely condensed silsesquioxanes: versatile tools in developing silica-supported olefin polymerization catalysts," Chem. Rev. vol. 102 (2002) 3525-3542.
C. Ohde et al., "Oxovandaium (IV) silsesquioxane complexes," Inorg. Chem. vol. 49 (2010) 2479-2485.
K. Pielichowski et al., "Polyhedral oligomeric silsesquioxane (POSS)-containing nanohybrid polymers," J. Adv. Polym. Sci. vol. 201 (2006) 225-296.
F. J. Feher et al., "Practical methods for synthesizing four incompletely condense silsesquioxanes from a single R8Si8O12 framework," Chem. Commun. (1998) 1279-1280.
D. B. Cordes et al., "Recent developments in the chemistry of cubic polyhedral oligosilsesquioxanes," Chem. Rev. vol. 110 (2010) 2081-2173.

(56) References Cited

OTHER PUBLICATIONS

T. Haddad et al, "Polyhedral Oligomeric Silsequioxane (POSS)-Styrene Macromers" Organomet. vol. 11 (2001) 155-164.
A. Tuteja et al., "Robust omniphobic surfaces," PNAS. vol. 105 (2008) 18200-18205.
R. H. Baney et al., "Silsesquioxanes," Chem. Rev. vol. 95 (1995) 1409-1431.
F. J. Feher et al., "Synthesis and structural characterization of a remarkably stable, anionic, incompletely condensed silsesquioxane framework," Chem. Commun. (1997) 829-830.
H. Liu et al., "A spectroscopic investigation of incompletely condensed polyhedral oligomeric silisesquioxanes (POSS-mono-ol, POSS-diol and POSS-triol): hydrogen-bonded interaction and host-guest complex," J. Organomet. Chem. vol. 693 (2008) 1301-1308.
T. W. Dijkstra et al., "Silsesquioxane models for geminal silica surface silanol sites. A spectroscopic investigation of different types of silanols," J. Am. Chem. Soc. vol. 124 (2002) 9856-9864.
S. T. Iacono et al., "Preparation of composite fluoropolymers with enhanced dewetting using fluorinated silsesquioxanes as drop-in modifiers," J. Mater. Chem. vol. 20 (2010) 2979-2984.
F. J. Feher et al., "Facile framework cleavage reactions of a completely condensed silsesquioxane framework," J. Am. Chem. Soc. vol. 119 (1997) 11323-11324.
F. J. Feher et al., "Reactions of incompletely-condensed silsequioxanes with pentamethylantimony: a new synthesis of metalasilsesquioxanes with important implications for the chemistry of silica surfaces," J. Am. Chem. Soc. vol. 114 (1992) 3859-3866.
F. J. Feher and T. L. Tajima, "Synthesis of a molybdenum-containing silsesquioxane which rapidly catalyzes the metathesis of olefins," J. Am. Chem. Soc. vol. 116 (1994) 2145-2146.
F. J. Feher et al., "Silsequioxanes as models for silica surfaces," J. Am. Chem. Soc. vol. 111 (1989) 1741-1748.
H. M. Cho et al., "A Mo(VI) alkylidyne complex with polyhedral oligomeric silsesquioxane ligands: homogeneous analogue of a silica-supported alkyne metathesis catalyst," J. Am. Chem. Soc. vol. 128 (2006) 14742-14743.
Michael E Wright, Chemical Modification of Fluorinated Polyimides: New Thermally Curing Hybrid Polymers with POSS, Macromolecules 2006, pp. 4710-4718.
T. S. Haddad and J. D. Lichtenhan, "Hybrid organic-inorganic thermoplastics: styryl-based polyhedral oligomeric silsesquioxane polymers," Macromol. vol. 29 (1996) 7302-7304.
K. Koh et al., "Precision synthesis of a fluorinated polyhedral oligomeric silsesquioxane-terminated polymer and surface characterization of its blend film with poly(methyl methacrylate)," Macromol. vol. 38 (2005) 1264-1270.
E. Lucenti et al., "Synthesis and characterization of osmium-containing silsesquioxanes: high-yield routes to {Os3 (CO)10(μ-H)[μ-O)Si7O10(c-C6H11)7]} and the new clusters {Os3(CO)10(μ-H)[μ-O)Si7O9(OH)2(c-C6H11)7]}, {[Os3 (CO)10(μ-H)]2[[μ-O)2Si7O9(OH)(c-C6H11)7}, {Os3(CO)10(μ-H)[μ-O)Si8O11(OH)(c-C6H11)8]}, and {[Os3(CO)10(μ-H)] 2(μ-O)2Si8O11(c-C6H11)8}," Organomet. vol. 26 (2006) 75-82.
K. Wada et al., "Synthesis and catalytic activity of group 4 metallocene containing silsesquioxanes bearing functionalized silyl groups," Organomet. vol. 23 (2004) 5824-5832.
K. Ohno et al., "Living radical polymerization by polyhedral oligomeric silsesquioxane-holding initiators; precision synthesis of tadpole-shaped organic/inorganic hybrid polymers," Macromol. vol. 37 (2004) 8517-8522.
S. T. Iacono et al, "Synthesis, characterization, and surface morphology of pendant polyhedral oligomeric silsesquioxane perfluorocyclobutyl aryl ether copolymers," Macromol. vol. 40 (2007) 9517-9522.
United States Patent and Trademark Office, Non-Final Office Action in U.S. Appl. No. 13/624,151, mailed Nov. 7, 2013, 12 pages total.
R. Duchateau et al, "Silica-Grafted Diethylzinc and a Silsesquioxane-Based Zinc Alkyl Complex as Catalysts for the Alternating Oxirane-Carbon Dioxide Copolymerization," Organomet. vol. 26 (2007) 4204-4211.

Fina, A., et al., "Polyhedral Oligomeric Silsesquioxanes (POSS) Thermal Degradation," Thermochimica Acta 440, pp. 36-42 (Nov. 14, 2005).
Badrinarayanan et al., "Zirconium tungstate/cyanate ester nanocomposites with tailored thermal expansivity," Composites Sci Technol., vol. 71 (2011) 1385-1391.
Hubbard et al., "Curing of a bisphenol E based cyanate ester using magnetic nanoparticles as an internal heat source through induction heating," Appl. Mater. Interf., vol. 5 (2013) 11329-11335.
Hamerton, "Studies on a dicyanate containing four phenylene rings and polycyanurate blends. 2. application of mathematical models to be catalysed polymerization process," Polymer, vol. 44 (2003) 4839-4852.
Hudson and Nelson, University Physics 2d ed. 754 (Saunders College Publishing: Philadelphia 1990), p. 754.
Zhao et al., "Autocatalytic curing kinetics of thermosetting polymers: a new model based on temeprature dependent reaction orders," Polymer, vol. 51 (2010) 3814-3820.
Davis et al., "Polycyanurate networks from anethole ddimers: synthesis and characterization," J. Polym. Sci. Polym. Chem., vol. 50 (2012) 4127-4136.
Machine Translation, Chinese Patent Publication No. 102659827A (2012), 9 pages total.
United States Patent and Trademark Office, Non-Final Office Action in U.S. Appl. No. 13/624,355, mailed Sep. 24, 2014, 7 pages total.
United States Patent and Trademark Office, Non-Final Office Action in U.S. Appl. No. 13/748,730, mailed Jul. 22, 2014, 8 pages total.
Crivello et al., "The synthesis, characterization, and photoinitiated cationic polymerization of silicon-containing epoxy resins," J. Polym. Sci. Part A: Polym. Chem., vol. 28 (1990) 479-503.
Georjon et al., "Effects of crosslink density on mechanical properties of high glass transition temperature polycyanurate networks," J. Appl. Polym. Sci., vol. 65 (1998) 2471-2479.
Guenther et al., "A new silicon-containing bis(cyanate) ester resin with improved thermal oxidation and moisture resistance," Macromol., vol. 39 (2006) 6046-6053.
Guenthner et al., "Cure characterization of tricyanate ester high-temperature composite resins," SAMPE Presentation (2011) 22 pages total.
Guenthner et al., "Synthesis, cure, kinetics, and physical properties of a new tricyanate ester with enhanced molecular flexibility," Polymer, vol. 52 (2011) 3933-3942.
Guenthner et al., "New insights into structure-property relationships in thermosetting polymers from studies of cocured polycyanurate networks," Macromol., vol. 45 (2012) 211-220.
Guenthner et al., "Effects of silicon substitution in the main chain network segments of polycyanurates," American Chemical Society National Conference, San Diego, CA (2012) 4 pages total.
Hay et al., "6: Processing and cure schedules for cyanate ester resins," Chem & Tech Cyanate Ester Resins (1994) 22 pages total.
Marella, "An investigation on the hydrolysis of polyphenolic cyanate esters using near-IR spectroscopy," A Masters Thesis submitted to the faculty of Drexel University (2008) 102 pages total.
Maya et al., "Oligodimethylsiloxane linked cyanate ester resins," Macromol., vol. 35 (2002) 460-466.
McConnell, "Resins for the hot zone, part 1: polyimides," Composites World, available at http://www.compositesworld.com/articles/resins-for-the-hot-zone-part-i-polyimides (2009), accessed Dec. 17, 2012, 6 pages total.
McConnell, "Resins for the hot zone, part 2: BMIs, CEs, benzoxazines and phthalonitriles," Composites World, available at http://www.compositesworld.com/articles/resins-for-the-hot-zone-part-ii-bmis-ces-benzo . . . (2009), accessed Dec. 17, 2012, 6 pages total.
Moore et al., "Asymmetric aryl polyhedral oligomeric silisesquioxanes (ArPOSS) with enhanced solubility," J. Organomet. Chem., vol. 696 (2011) 2676-2680.
Moore et al., "Increasing the solubility of inert peripherally aromatic poss," ACS Division of Polymer Chem Document No. 154:410824, citing Polym. Preprints, vol. 52 (2011).
Reams et al., "Effect of chemical structure and network formation of physical properties of di(cyanate ester) thermosets," Appl. Mater. Interfac., vol. 4 (2012) 527-535.

(56) References Cited

OTHER PUBLICATIONS

Shimp et al., "Moisture effects and their control in the curing of polycyanate resins," ACS PMSE Prepr., vol. 66 (1992) 504-505.
Shimp et al., "Cyanate esters—a new family of high temperature thermosetting resins," High Temp. Polym. (1989) 127-140.
Ogawa et al., "Development of a transparent and ultrahydrophobic glass plate," Jpn. J. Appl. Phys., vol. 32 (1993) L614-L615.
Sagiv et al., "Organized monolayers by adsorption. 1. formation and structure of oleophobic mixed monolayers on solid surfaces," JACS, vol. 102 (1980) 92-98.
United States Patent and Trademark Office, Notice of Allowance in U.S. Appl. No. 13/210,915, mailed Nov. 12, 2014, 8 pages total.
Brenier, "Bifunctional surfaces with superhydrophobic and plasmonic properties," J. Phys. Chem. C., vol. 115 (2011) 10544-10549.
Campos et al., "Fluoroalkyl-functionalized silica particles: synthesis, characterization, and wetting characteristics," Langmuir, vol. 27 (2011) 10206-10215.
Campos et al., "Superoleophobic surfaces through control of sprayed-on stochastic topography," Langmuir, vol. 28 (2012) 9834-9841.
Wright, "The synthesis of new silane based bis(cyanate) ester monomers for use in high performance composite resins," Proc. American Chemical Society (2004) 2 pages total.
Yameen et al., "Polycyanurate thermoset networks with high thermal, mechanical, and hydrolytic stability based on liquid multifunctional cyanate ester monomers with bisphenol A and AF units," Macromol. Chem. Phys., vol. 209 (2008) 1673-1685.
I. T. Horvath et al., Excerpts from "Flourous Chemistry: Scope and Definition," IN: Handbook of Fluorous Chemistry, J. A. Gladysz, ed., Wiley-VCH Verlag GmbH & Co: Weinheim (2004) 1-4.
S. C. Kettwich et al., "Anomalous macromolecular assembly of partially fluorinated polyhedral oligomeric silsesquioxanes," New. J. Chem., vol. 36 (2012) 941-946.
S. M. Ramirez et al., "Reversible addition-fragmentation chain transfer (RAFT) copolymerization of fluoroalkyl polyhedral oligomeric silsesquioxane (F-POSS) macromers," Polym. Chem., vol. 4 (2013) 2230-2234.
S. M. Ramirez et al., "Supporting Information: Reversible addition-fragmentation chain transfer (RAFT) copolymerization of fluoroalkyl polyhedral oligomeric silsesquioxane (F-POSS) macromers," (2013) 4 pages total.
S. T. Iacono et al., "Facile synthesis of hydrophobic fluoralkyl functionalized silsesquioxane nanostructures," Chem. Commun. (2007) 4992-4994.
C. Hartmann-Thompson (ed.), Applications of Polyhedral Oligomeric Silsesquioxanes, IN: Advances in Silicon Science 3, Springer: Dordrecht (2011).
United States Patent and Trademark Office, Final Office Action in U.S. Appl. No. 13/159,950, mailed Apr. 9, 2015, 13 pages total.

* cited by examiner

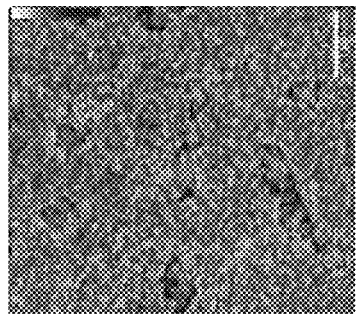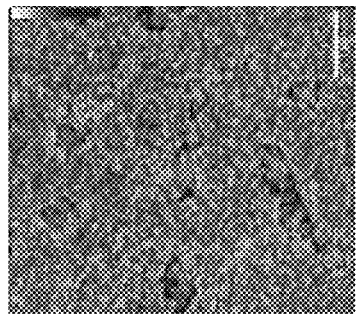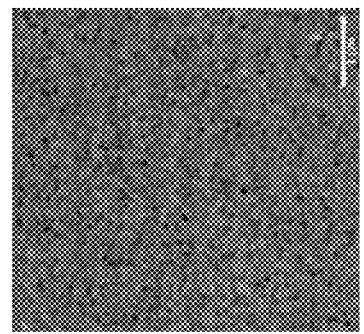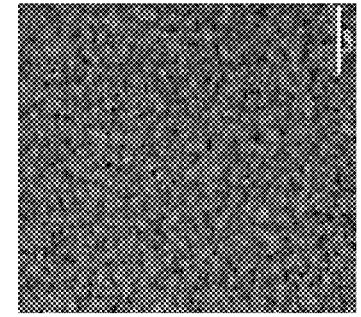
FIG. 11A  FIG. 11B  FIG. 11C  FIG. 11D
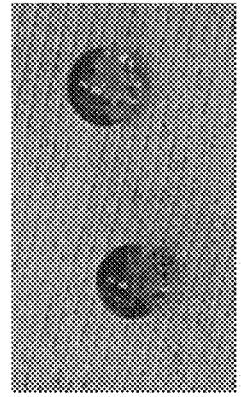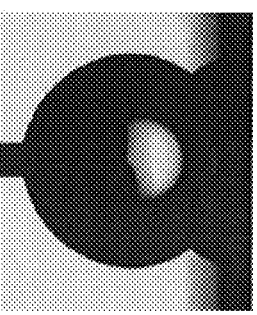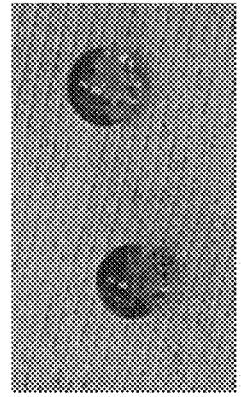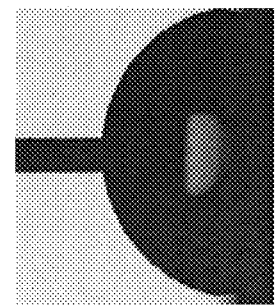
FIG. 12A  FIG. 12B  FIG. 12C  FIG. 12D

CONTROLLED POLYMERIZATION OF FUNCTIONAL FLUORINATED POLYHEDRAL OLIGOMERIC SILSESQUIOXANE MONOMERS

RIGHTS OF THE GOVERNMENT

The invention described herein may be manufactured and used by or for the Government of the United States for all governmental purposes without the payment of any royalty.

FIELD OF THE INVENTION

The present invention is directed to low surface energy materials and, in particular, to the use of polyhedral oligomeric silsesquioxanes as a low surface energy material.

BACKGROUND OF THE INVENTION

Low surface energy materials have proven useful in many applications, including non-wetting fabrics, smart surfaces, membranes, ice-phobic surfaces, as well as anti-fouling surfaces and coatings. Fluoroalkyl polyhedral oligomeric silsesquioxanes (hereafter referred to as "F-POSS"), having surface energy values, $\gamma_{sv}$, of about 9.3 mN/m, have emerged as promising materials for these types of applications.

While the addition of F-POSS to polymers often yields superhydrophobic and superoleophobic material properties, the production of the superhydrophilic or superoleophobic surface depends on the selection of the polymer matrix. For example, the lack of covalent bonding between F-POSS molecules and spun cast films demonstrate poor surface robustness and are susceptible to surface abrasion. F-POSS also exhibits limited solubility in non-fluorinated solvents, thereby limiting the types of polymer solvents. Short chain (trifluoropropyl) F-POSS compounds have been covalently attached to polymer chain ends through functionalization of the incompletely condensed cage; however, layers comprising these F-POSS compounds do not demonstrate low surface energy property enhancement.

Reactions of long chain F-POSS disilanol compounds with a variety of dichlorosilanes have resulted in a series of functional F-POSS compounds having an increased solubility in organic solvents while retaining low surface energy properties. Moreover, the resultant functionalized F-POSS compounds are covalently bonded to the host substrate, polymer backbone, or surface, which leads to a more mechanically stable and abrasion resistance material. One particular exemplary compound, methacrylate based F-POSS macromere ("MA-F-POSS") has been shown to produce methyl methacrylate ("MMA") copolymers with limited control of molecular weight and polymer optical interconnect via traditional azobisisobutyronitirle ("AIBN") initiated free radical polymerization.

However, there remains a need for improved methods of synthesizing F-POSS-centric copolymers while affording enhanced control of molecular weight, desirable polydispersity indices, and low surface energy properties.

SUMMARY OF THE INVENTION

The present invention overcomes the foregoing problems and other shortcomings, drawbacks, and challenges of controlled synthesis of F-POSS-centric copolymers with specified polydispersity indicies and low surface energy properties. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a polymer comprises polymerized units of norbornene fluoroalkyl polyhedral oligomeric silsesquioxane.

According to aspects of the present invention, the polymer may be norbornene fluoroalkyl polyhedral oligomeric silsesquioxane. Still other aspects of the present invention may include a polymerized unit of an alkene chain derived from a cyclic alkene.

In accordance with another embodiment of the present invention, a method of synthesizing the polymer includes polymerizing, via ring-opening metathesis polymerization, a stressed cyclic olefin F-POSS macromer.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 11A-11D are atomic force microscopy images of surfaces treated with F-POSS polymers according to embodiments of the present invention.

FIGS. 12A and 12C are images of water droplets wetting a silicon wafer surface treated with 0 wt % F-POSS copolymer and 25 wt % F-POSS copolymer, respectively.

FIGS. 12B and 12D are images of water droplets and hexadecane droplets wetting a silicon wafer surface treated with 0 wt % F-POSS copolymer and 25 wt % F-POSS copolymer, respectively.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates to methods of controlling the synthesis, or polymerization of, long chain fluoroalkyl polyhedral oligomeric silsesquioxanes ("F-POSS") and the F-POSS copolymers made therefrom. Generally, the F-POSS copolymer according to embodiments of the present invention have the formula:

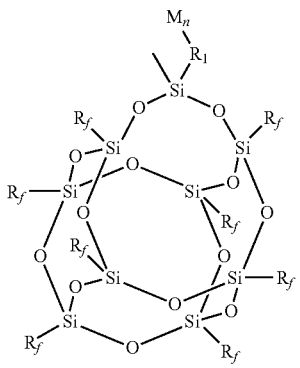

wherein $R_f$ is a fluoroalkyl chain, M is a polymer chain comprising of n units of monomer, and $R_1$ is a linking group between the F-POSS macromolecule and M.

As used herein, a "monomer" includes any subunit (i.e., a portion of a macromolecule comprising many constitutional units, such as, an atom or group of atoms, including pendant atoms or groups, if any) that may chemically bind with another subunit to form a "polymer." The subunits comprising the polymer may be of a single type (that is, a "homopolymer") or of a plurality of types (a so-called "heteropolymer"). The number of subunits comprising the polymer may be referred as a "chain length."

"Copolymer," as used herein, is a heteropolymer comprising two or more monomers and, more particularly, a block copolymer comprises a copolymer having two or more homopolymer subunits linked by covalent bonding.

"Chain transfer," also referenced as "CT" herein, is defined as a polymerization reaction in which the activity of growing polymer chain is transferred to another molecule, i.e., the "chain transfer agent."

As used herein, a "radical" is defined as an atom, molecule, or ion having unpaired valence electrons or an open electron shell.

"Olefin metathesis," as used herein, is an organic reaction in which fragments of alkenes are redistributed by scission and regeneration of carbon-carbon double bonds.

As used herein, "substituted" is defined by the substitution of a hydrogen on a carbon by a univalent group including, but not limited to, halogen, hydroxy, thiol, amino, nitro, cyano, C1-C4 alkyl, alkylamino, carboxy, amido, vinyl, and C1-C5 alkoxy.

"Aryl," as used herein, is defined to include an organic radical derived from an aromatic hydrocarbon consisting of 1-3 rings and containing about 6 to about 18 carbon atoms. Aryl includes, but is not limited to, phenyl and naphthyl.

Figure 1:
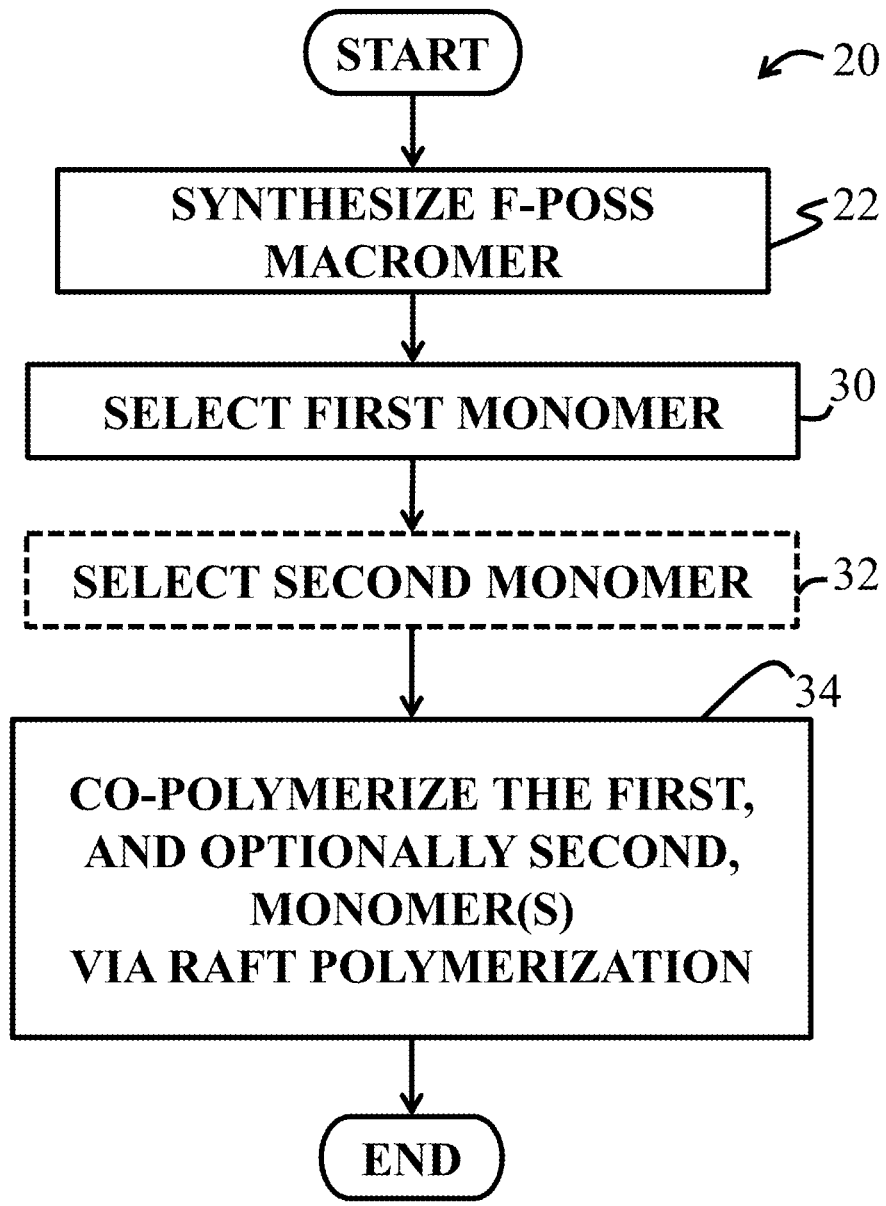
FIG. 1 is a flowchart illustrating RAFT polymerization of F-POSS according to an embodiment of the present invention.

Turning now to figures, and in particular to FIG. 1, a flowchart 20 illustrating a method of controlling synthesis a long chain F-POSS according to one embodiment of the present invention begins with synthesis of an F-POSS macromer (Block 22). In that regard, and as exemplarily shown in FIG. 2, synthesis 22 may include a reaction of incompletely condensed silsesquioxane 24 with 3-methacryloxypropylmethyldichlorosilane 26 in the presence of triethylamine to yield an MA-F-POSS compound 28. As to the illustrative embodiment, $R_f$ may be —$CH_2CH_2(CF_2)_7CF_3$; however, $R_f$ may be any fluoroalkyl group and should not be limited to the particular embodiments described herein.

Figure 2:
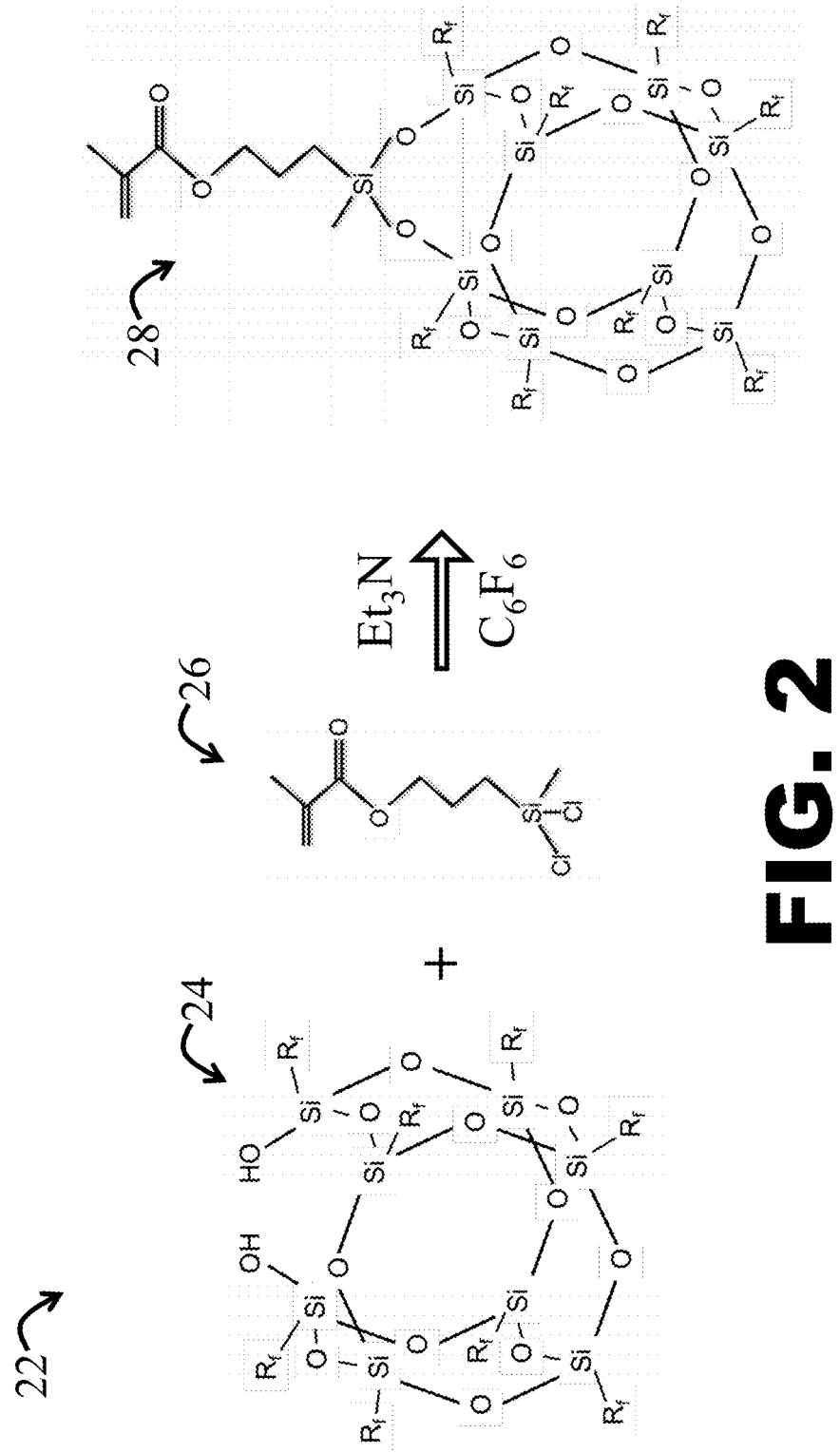
FIG. 2 is a representation of the synthesis of MA-F-POSS according to an embodiment of the present invention.

In Block 30, and optionally in Block 32, of FIG. 2, first, and optionally second, monomer may be selected for polymerization. While not limiting, the first monomer as shown herein is methyl methacrylate ("MMA"). Selection of the first, and optionally second, monomer may be based on at least one characteristic desired of the F-POSS macromer, including, for example, oleophobicity, hydrophobicity, increased antibacterial, and so forth. Polymerization via a reversible addition fragmentation chain-transfer polymerization ("RAFT") mechanism occurs at Block 34 as will be explained in greater detail below.

Figure 3:
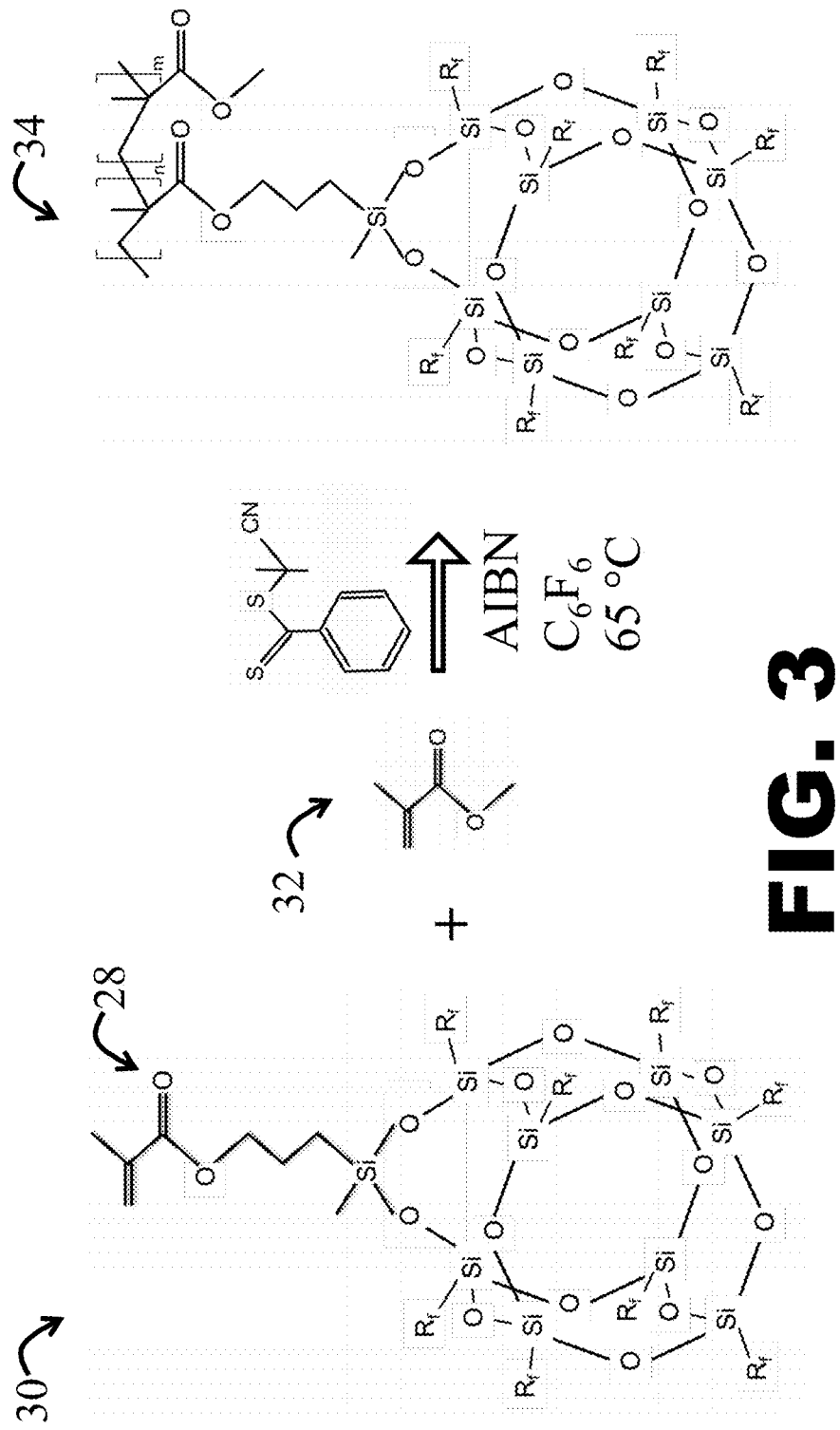
FIG. 3 is a representation of the synthesis of poly(MA-F-POSS-co-MMA) according to an embodiment of the present invention.

Referring now to FIG. 3, copolymerization of block copolymers of MA-F-POSS and MMA proceeds according to the RAFT mechanism (Block 34 of FIG. 1). In that regard, as is known to those skilled in the art, a chain transfer agent ("CTA") having at least one weak chemical bond facilitates the chain transfer reaction. Common chain transfer agents may include thiols, such as n-dodecyl-β-D-maltopyranoside ("DDM"), and halocarbons, such as carbon tetrachloride. Chain transfer agents may also be referred to as polymerization modifiers or polymerization regulators.

As shown in FIG. 3, RAFT polymerization may include copolymerization of the MA-F-POSS compound 28 with MMA 32 in the presence of the CTA to form a resulting copolymer, poly(MA-F-POSS-co-MMA) 34. According to the illustrative embodiment, the CTA is 2-cyanopropan-2-yl benzodithioate, and the concentration of the CTA may vary, for example, from 0 wt % to 25 wt % relative to MMA.

Figure 4:
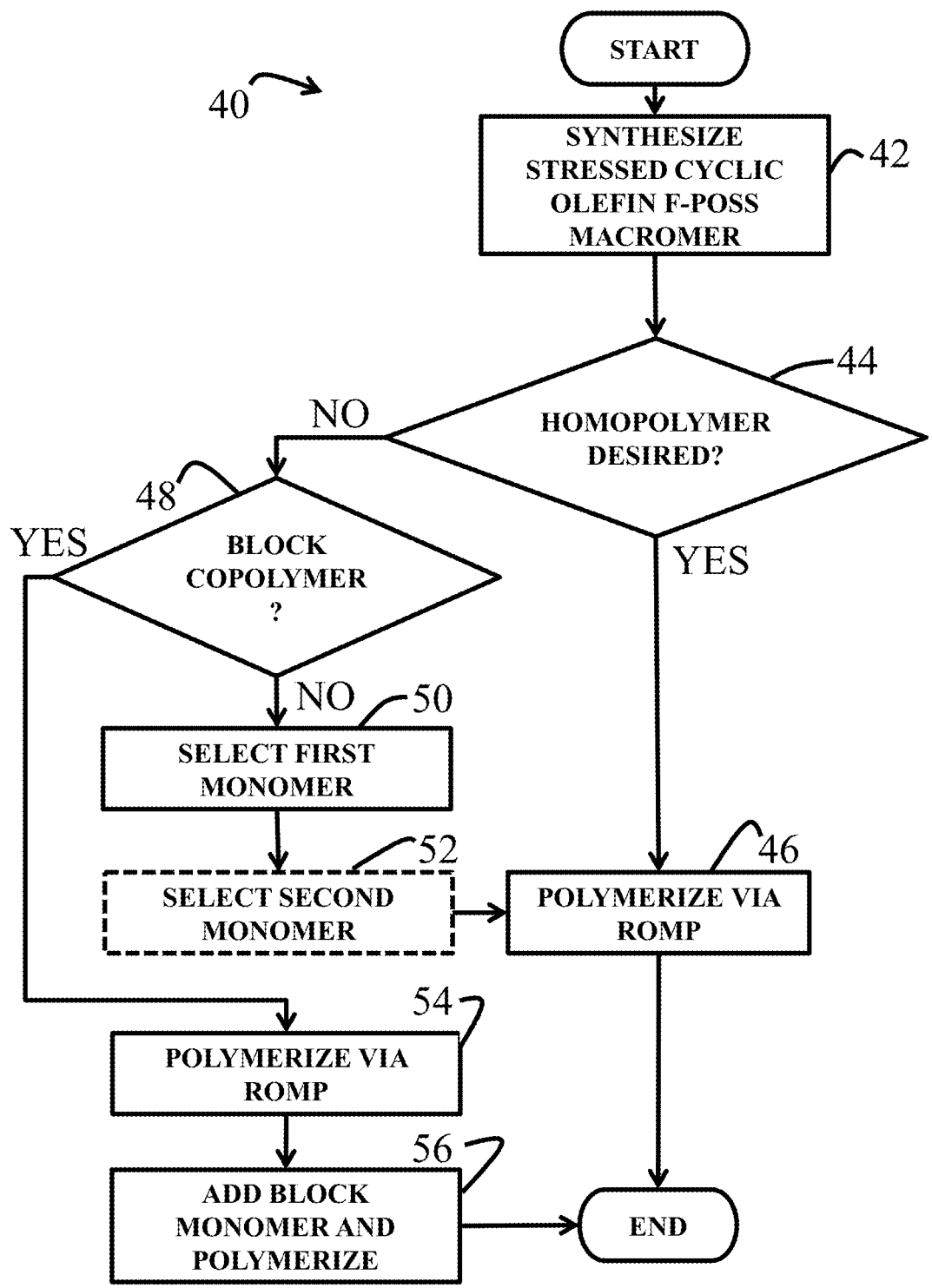
FIG. 4 is a flowchart illustrating ROMP polymerization of F-POSS according to an embodiment of the present invention.
Figure 5:
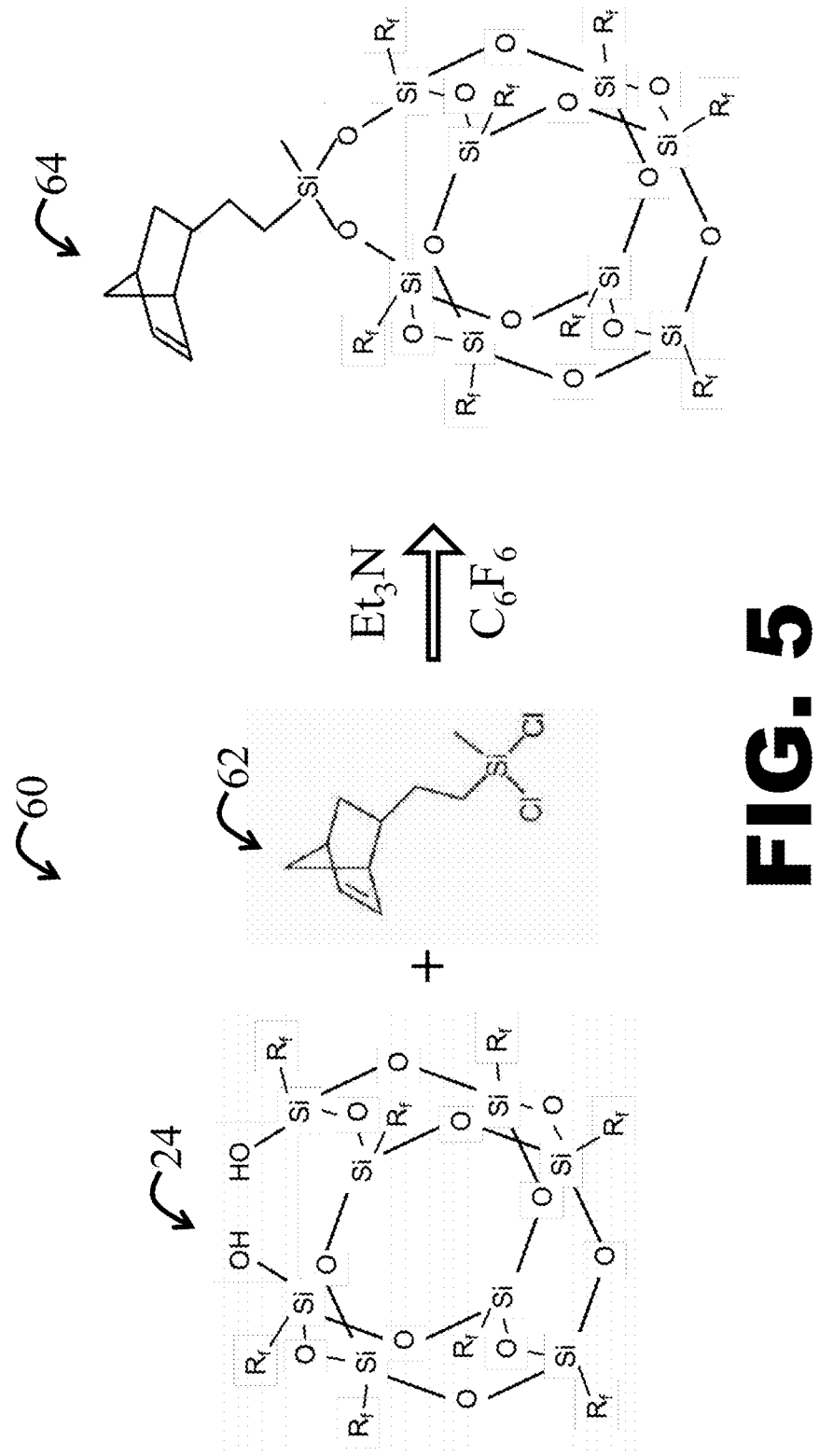
FIG. 5 is a representation of the synthesis of NB-F-POSS according to an embodiment of the present invention.

Turning now to FIG. 4, a flowchart 40 illustrating a method of controlled polymerization of F-POSS according to another embodiment of the present invention is shown. In Block 42, a strained cyclic olefin F-POSS macromer is synthesized. In that regard, and as exemplarily shown in FIG. 5, the synthesis 60 may include a reaction of incompletely condensed silsesquioxane 24 with [(5-bicyclo[2.2.1]hept-2-enyl)ethyl]methyldichlorosilane (hereafter, "norbornene methyldichlorosilane" 62) in the presence of triethylamine and hexafluorobenzene to yield norbornene F-POSS ("NB-F-POSS" 64). However, other cyclic olefins (alkenes) may also be used, such as cyclopentene. Also, as to the illustrative embodiment, $R_f$ may be —$CH_2CH_2(CF_2)_7CF_3$. However, $R_f$ may be any fluoroalkyl group and should not be limited to the particular embodiments described herein.

If desired, the NB-F-POSS may be polymerized into a homopolymer ("poly(NB-F-POSS)"). If such a single-species polymer is desired ("Yes" branch of Decision Block 44), polymerization may proceed according to a ring-opening metathesis polymerization ("ROMP") mechanism (Block 46). In the case of ROMP as applied to norbornene, the norbornene molecule consists of a cyclohexene ring with a methylene bridge between C-3 and C-6. The norbornene molecule additionally carries a double bond that induces significant ring strain and significant reactivity. In that regard, as is known to those skilled in the art, a catalyst may be used to attack the double bond within the strained cyclic olefin of the NB-F-POSS to open the norbornene ring structure. Such a suitable catalyst may include a transition metal carbene complex configured to catalyze olefin metathesis. Suitable examples include, but are not limited to, ruthenium-based first or second generation Grubbs' catalyst or Hoveyda-Grubbs' Catalyst.

With the ring opened to a linear chain double bonded to the metal complex comprising the catalyst, the carbene may then react with an available monomer to undergo polymerization. The polymers produced according to the ROMP reaction have been observed to possess a very narrow range of molecular weights, a feature that is very difficult to otherwise achieve by standard polymerization methods (such as free radical polymerization). The polydispersities (that is, the weight average molecular weight divided by the number average molecular weight) are expected to approach unity, which corresponds to nearly identical polymer chain lengths observed in a sample. An additional benefit of this mechanism is that ROMP systems are typically living polymerization mechanisms. For example, equivalents of a first monomer (for example, norbornene) may be polymerized and then a second monomer may be added for polymerization after the first monomer is consumed. This is contrary to the often spontaneous and uncontrollable termination of free radical polymerization reactions by way of coupling or disproportionation mechanisms.

Figure 6:
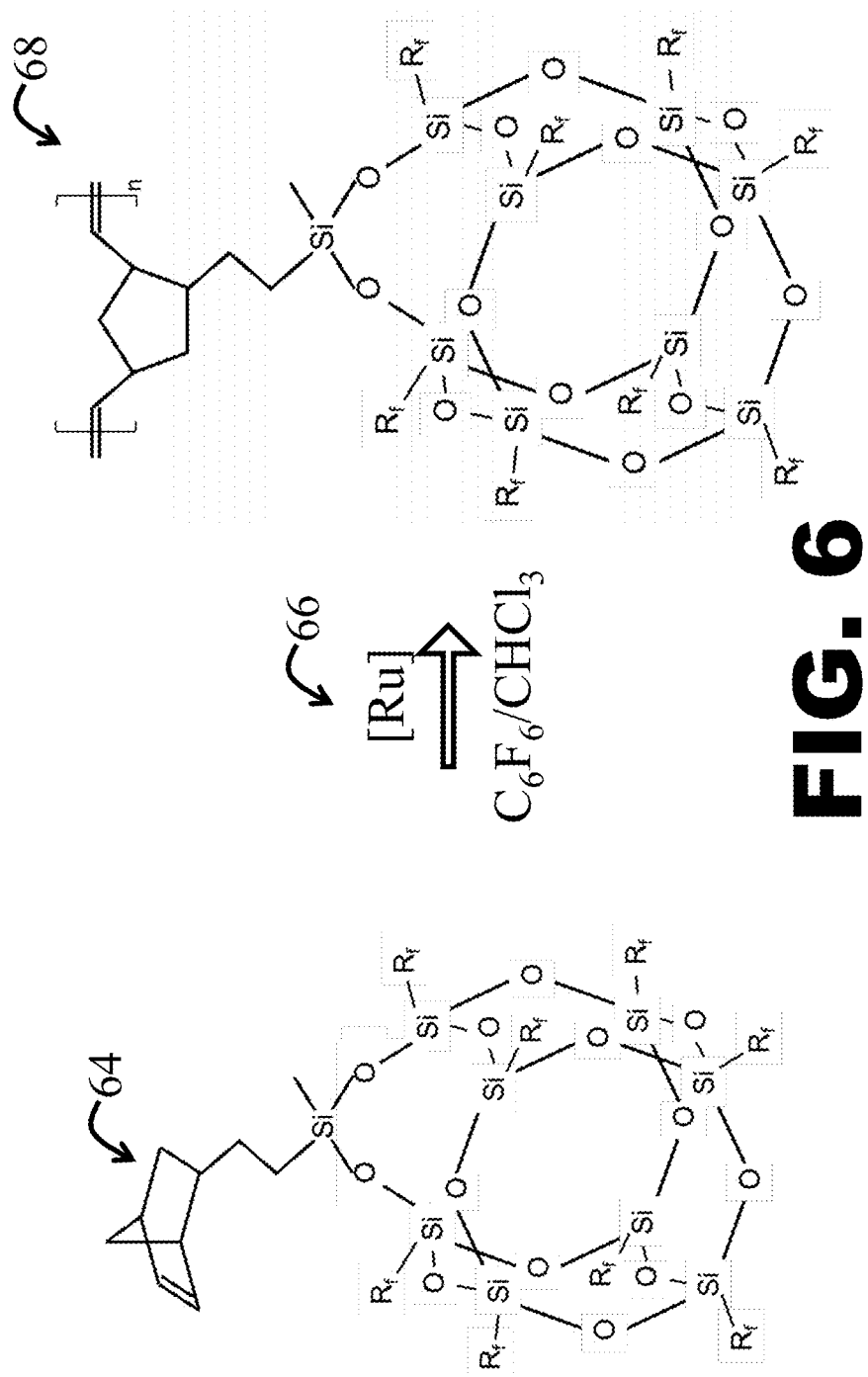
FIG. 6 is a representation of the synthesis of poly(NB-F-POSS) according to an embodiment of the present invention.

Polymerization via ROMP (Block 46) is schematically shown, according to one embodiment of the present invention, in FIG. 6, wherein NB-F-POSS 64, in the presence of a catalyst 66 and chloroform or hexafluorobenzene, yields poly(NB-F-POSS) 68. In one example of the disclosed invention, the catalyst 66 may be Grubbs' Second Generation Catalyst ($C_{46}H_{65}Cl_2N_2PRu$).

Returning attention to the flowchart 40 of FIG. 4, if a homopolymer is not desired ("No" branch of Decision Block 44), polymerization may proceed by a copolymer or block copolymer (Decision Block 48). If a copolymer is desired ("No" branch of Decision Block 48), a first, and optionally second, monomer may be selected for polymerization in Blocks 50 and 52, respectively. As noted above, selection of the first, and the optional second, monomer may be based, at least in part, on at least one characteristic desired of the F-POSS macromer, including, for example, oleophobicity, hydrophobicity, increased antibacterial, and so forth. Non limiting examples of monomers may include norbornene triethylene glycol (2-[2-(2-Hydroxyethoxy)ethoxy]ethanol), cyclooctene, cyclopentene, cyclobutene, and cyclooctadiene.

After the first, and optional second, monomer is selected, polymerization may proceed via ROMP (Block 46), as previously discussed.

Figure 7:
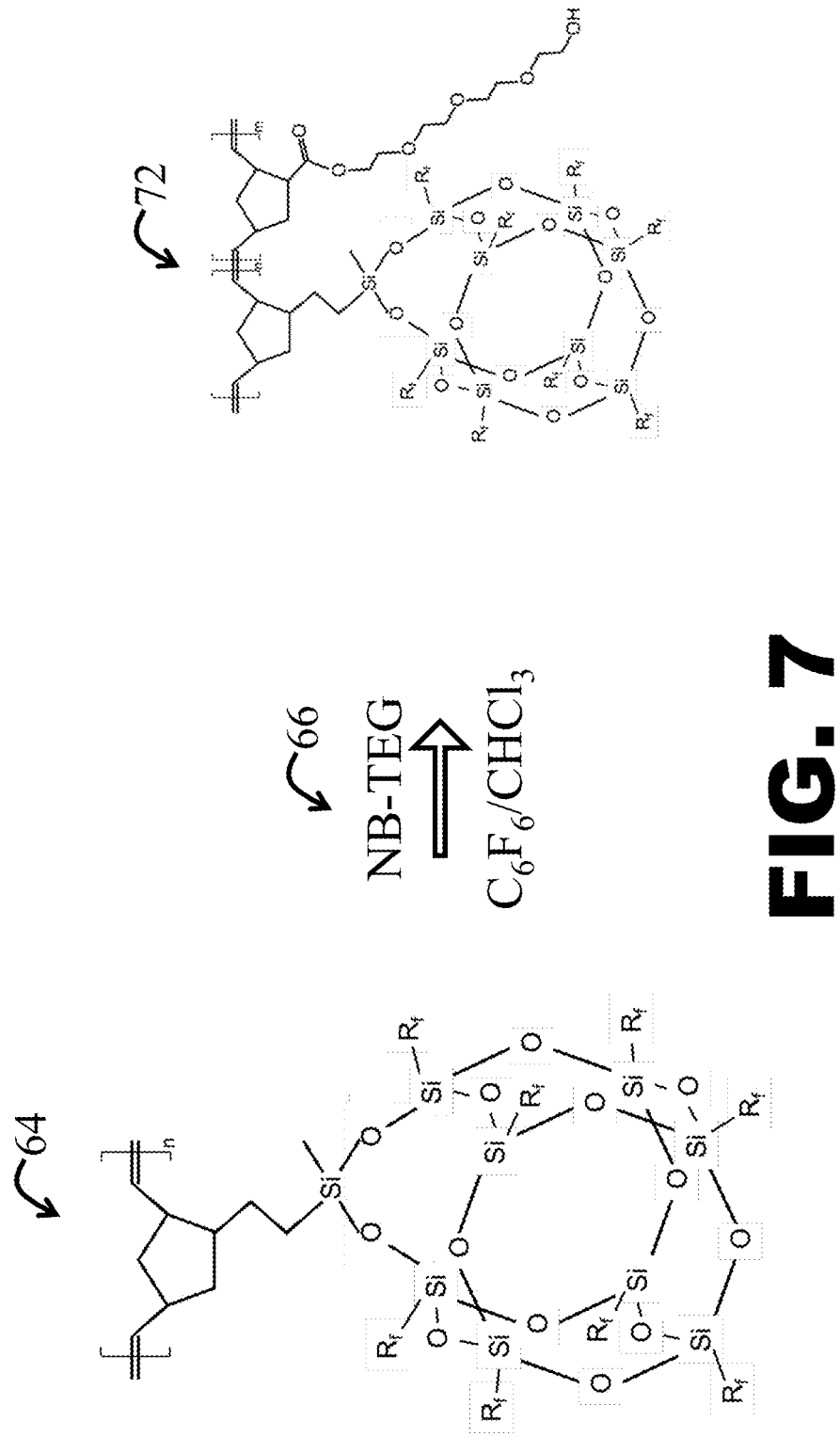
FIG. 7 is a representation of the synthesis of poly(NB-F-POSS-co-octene) according to an embodiment of the present invention.

A schematic representation of an exemplary copolymer and associated reaction are shown in FIG. 7. As shown, NB-F-POSS 64 is combined with cyclooctene 70 in the presence of a catalyst 66 and chloroform or hexafluorobenzene. As above, the catalyst 66 may be a ruthenium-based metal carbine complex or other suitable catalyst known to one of ordinary skill in the art. The resultant copolymer is poly(NB-F-POSS-co-octene) 72.

If a polymer having hybrid properties is desired ("Yes" branch of Decision Block 48), the first monomer may be polymerized via ROMP (Block 54) and then, after consumption of the first monomer, polymerized with a second monomer via ROMP (Block 56).

Figure 8:
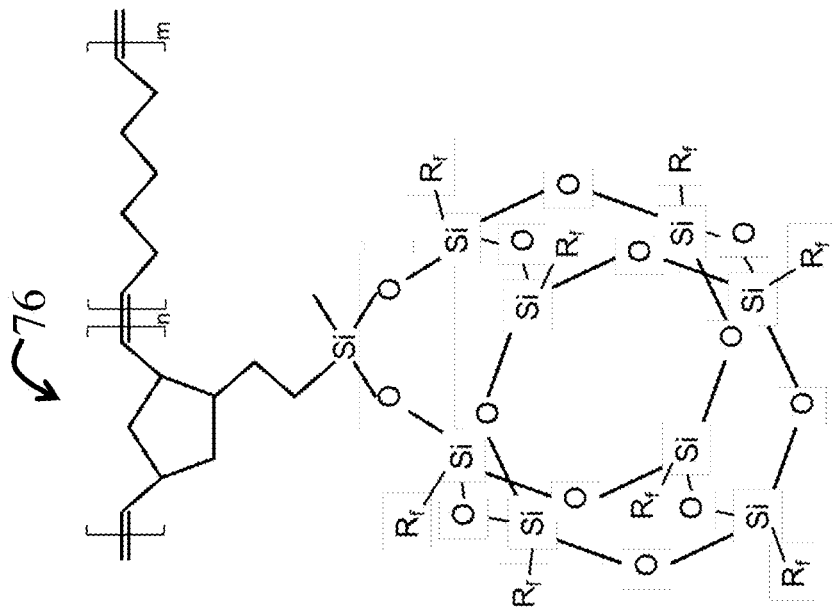
FIG. 8 is a representation of the synthesis of a F-POSS diblock copolymer according to an embodiment of the present invention.
Figure 8:
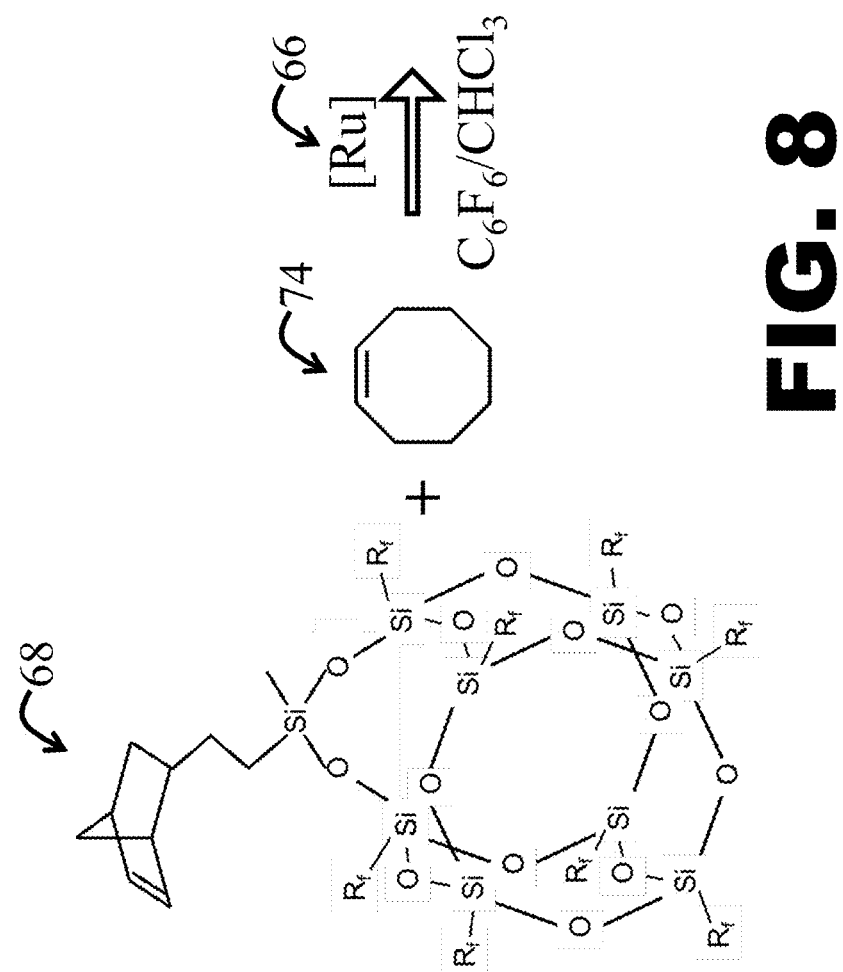

A schematic representation of an exemplary block copolymer and associated reaction are shown in FIG. 8. As shown, NB-F-POSS is first polymerized into the homopolymer poly(NB-F-POSS) (not shown) of suitable length (designated by "n" in the diblock polymer 76). Since ROMP is a living polymerization process, further chain extension may proceed after consumption of NB-F-POSS monomers. For example, the homopolymer poly(NB-F-POSS) 68 may react with a second monomer in the presence of an (in this instance norbornene triethylene glycol 74 ("NB-TEG")), chloroform or hexafluorobenzene, and the catalyst 66. The resultant diblock polymer 76 includes n units of poly(NB-F-POSS) and m units of NB-TEG.

Although not described in detail herein, varied block copolymer F-POSS macromeres may be synthesized in accordance with other, conventional ring-opening polymerization methods.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

MA-F-POSS was synthesized according to methods described above. Specifically, 3-methacryloxypropylmethyldichlorosilane (Gelest, Inc., Morrisville, Pa.) was distilled prior to use. Hexafluorobenzene ($C_6F_6$, Synquest Laboratories, Inc., Alachua, Fla.), mixture of 1,3-dichloro-1,2,2,3,3-pentafluoropropanes (AK-225, AGC Chemicals Americas, Inc., Exton, Pa.), and hexadecane (Sigma-Aldrich, St. Louis, Mo.) were used without further purification, unless otherwise stated. All reactions were performed under nitrogen.

Copolymerization was carried out in a 5 mL reactor equipped with a magnetic stirring bar, methyl methacrylate (MMA, 2.00 g, 20 mmol), F-POSS-MA (0.20 g, 0.048 mmol), 2-cyanopropan-2-yl benzodithioate (8.80 mg, 0.04 mmol), and azobisisobutyronitrile (AIBN, 1.30 mg, 0.008 mmol) were dissolved in a hexafluorobenzene. The resulting solution was added to a reaction vial and sealed with septa. The solution was deoxygenated via nitrogen purge for 15 min and immediately submerged in a 65° C. oil bath for a preset reaction time. Polymerization was then quenched by cooling with ice water and the addition of a hydroquinone (THF) solution (10 µL, 10 mg/mL). Polymer was precipitated in methanol, filtered, and dried under vacuum to yield a pink white solid (0.659 g).

Figures 9A, 9B, 9C:
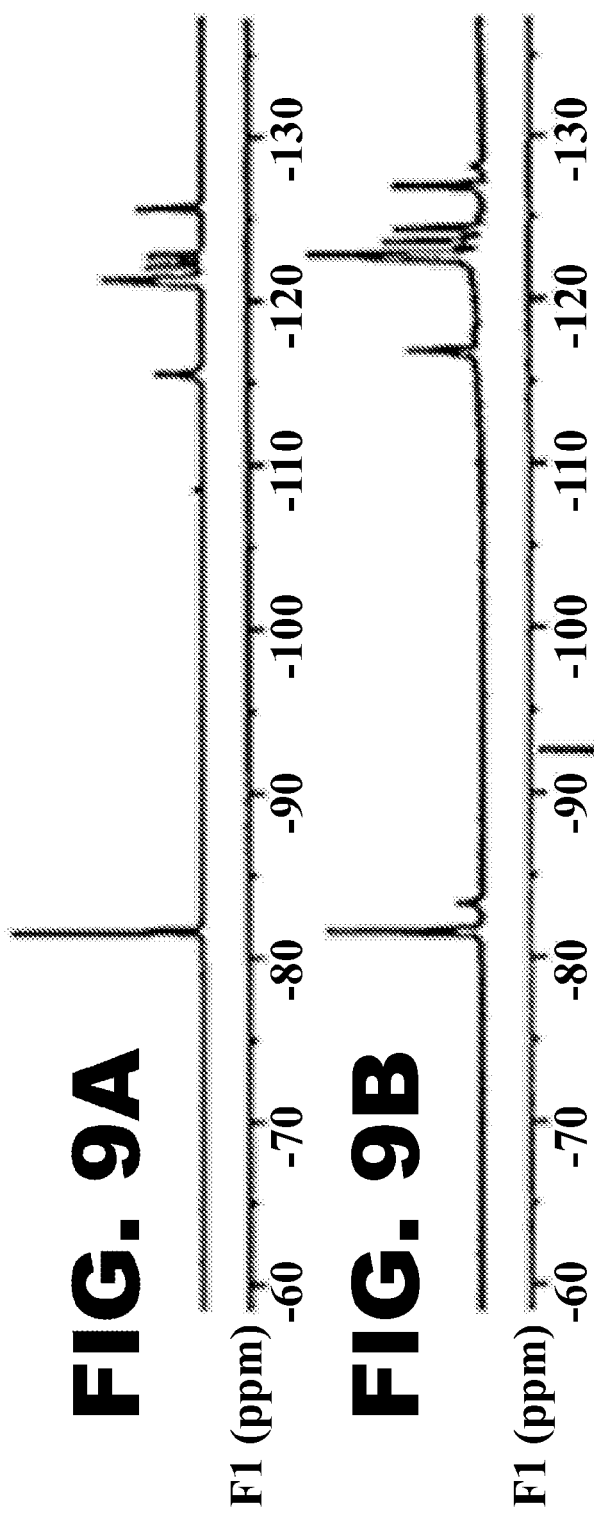
FIGS. 9A-9C include $^{19}F$ (FIGS. 9A and 9B) and $^{1}H$ (FIG. 9C) spectra of MA-F-POSS and an F-POSS copolymer composition.

All polymerizations were run for 16 hr in hexafluorobenzene at 65° C. and yielded polymers having molecular weights ranging from 23 kg/mol to 58 kg/mol (Table 1, below). Polymers were characterized by multinuclear NMR ($^1$H and $^{19}$F), with spectra being obtained on Bruker 300-MHz and 400-MHz spectrometers using 5 mm o.d. tubes. $^{19}$F NMR spectrum of MA-F-POSS (FIG. 9A) and $^{19}$F and $^1$H NMR spectra of 5 wt % F-POSS copolymer composition (FIGS. 9B and 9C, respectively) are shown. The illustrative spectra are typical of all spectra collected. The resonance signals at 0.5-2 ppm and 3.6 ppm of the $^1$H NMR spectrum are attributed to PMMA; groups associated with F-POSS are obstructed from view by the PMMA resonance peaks. The peaks observed in the $^{19}$F NMR spectrum are attributed to the fluorinated chains of F-POSS. An increase in peak broadness of F-POSS copolymer (FIG. 9B) as compared to MA-F-POSS (FIG. 9A) was observed, providing further evidence of copolymerization. Differential scanning calorimetry (DSC) of the synthesized polymers was measured on a TA Instruments DSC (Newcastle, Del.) under $N_2$ at a ramp rate of 10° C./min from 50° C. to 160° C. using a heat/cool/heat cycle and revealed glass transition temperatures ($T_g$) ranging from 126° C. to 129° C., which indicates the F-POSS chains have little impact on PMMA chain mobility. The $T_g$ values were determined from the $2^{nd}$ heat cycle.

Example 2

Polymerization of MMA homopolymers was performed in hexafluorobenzene to determine the impact of a fluorinated solvent on RAFT polymerization. Little-to-no effect was observed. However, there was a noticeable decrease in polymerization conversion with the addition of macromer MA-F-POSS to the copolymerization. This was attributed to the bulky nature of F-POSS leading to steric hindrance of the methacrylate group.

Figure 10A:
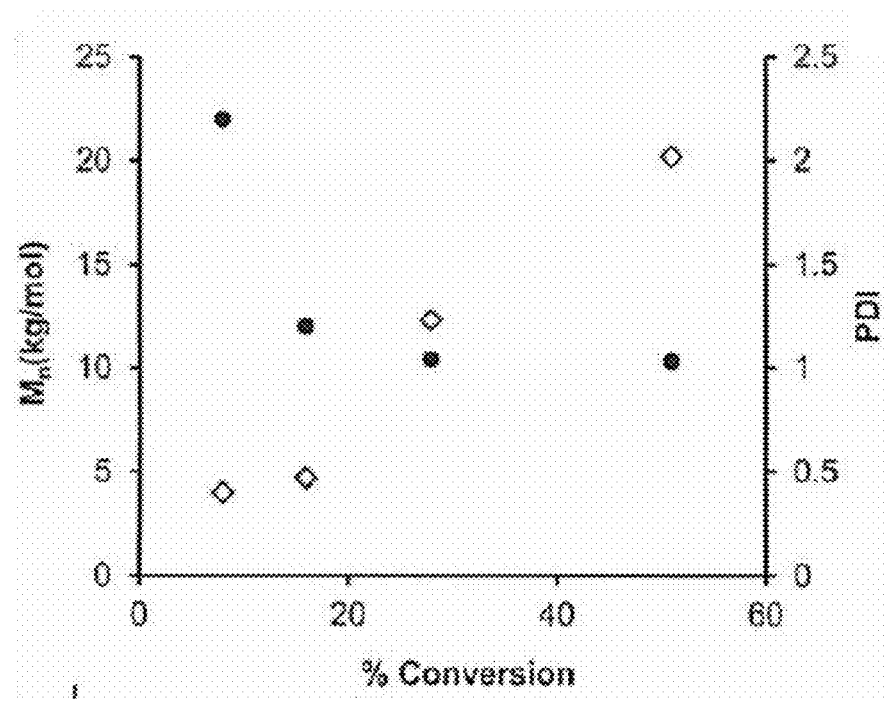
FIG. 10A is a graphic representation of exemplary data from a comparison of molecular weight versus monomer conversion.

Attempts at homopolymerization of MA-F-POSS did not yield any polymer, making it difficult to study the kinetic influence of MA-F-POSS on copolymerization. To determine the influence of F-POSS on the copolymerization, a conversion versus molecular weight ($M_n$) study was performed with 10 wt % F-POSS copolymer compositions (FIG. 10A). This plot demonstrates that molecular weight increased with time, and the polydispersity index (PDI) decreased to about 1.0, which indicates that the polymerizations were well controlled. F-POSS copolymers with lower F-POSS compositions (less than about 10 wt %) were found to be soluble in common PMMA solvents, while higher compositions produced stable, slightly turbid solutions.

Molecular weights were determined by size exclusion chromatography, multi-angle laser light scattering (SEC-MALLS) using the fluorinated solvent Asahiklin AK-225, which is a mixture of dichloropentafluoropropanes (Asahi Glass Co., Ltd., Chiyoda-ku, Tokyo) as the mobile phase. The solvent was filtered through a 0.02 μm filter to remove any dust or particulates. Samples were analyzed at 1.0 mL/min flow rate through a PLgel 5 μm mixed E column (Agilent Technologies, Inc., Santa Clara, Calif.) and PLgel 3 μm mixed C column (Agilent Technologies, Inc.) measuring at 25° C. SEC-MALS instrumentation consisted of an Agilent 1260 Infinity HPLC quaternary pump, Agilent 1260 Infinity Autosampler, DAWN® HELOS® MALS detector (Wyatt Technology Co., Santa Barbara, Calif.) operating at 658 nm, and a Wyatt Optilab® rEX differential refractive index detector (Wyatt Technology Co.). The accuracy and reproducibility was confirmed with a polymethylmethacrylate (Sigma-Aldrich) standard 40,000 g/mol. Absolute molecular weights were determined using the Wyatt Astra VI software package. The specific refractive index increment (dn/dc) for copolymers was determined online using 100% mass recovery method in Astra VI software package. Polymer samples (0.80-1.50 mg/mL) were allowed to dissolve in solvent overnight and passed through a 0.2 μm PTFE syringe filter before measurement.

Figure 10B:
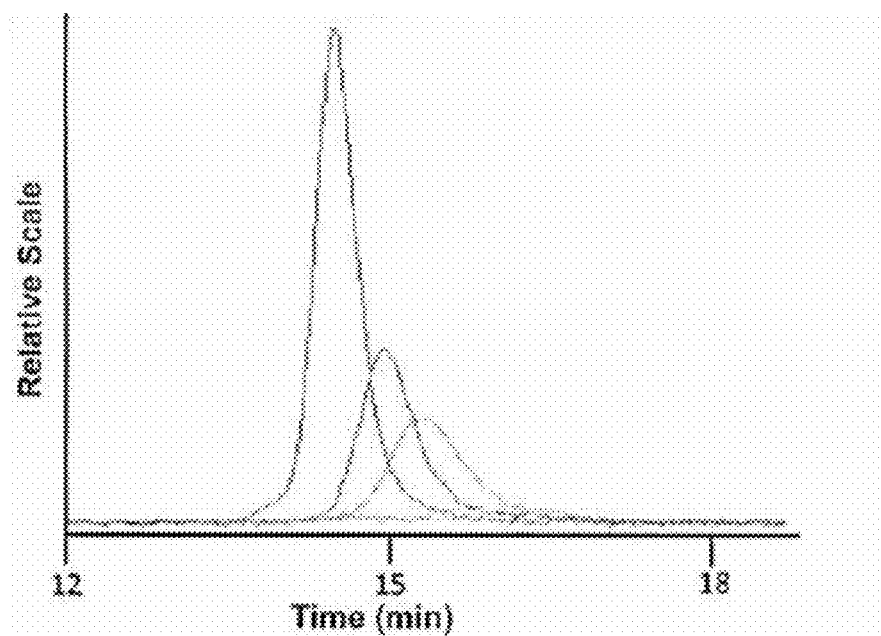
FIG. 10B is a chromatograph of three co-polymers synthesized according to embodiments of the present invention.

Exemplary SEC chromatograms of copolymers are shown in FIG. 10B. The use of fluorinated solvent was critical due to the large amount of fluorinated chains on F-POSS. The proper selection of mobile phase is necessary for an accurate determination of molecular weight. AK-225 has been found to be a suitable SEC solvent for PMMA. Because AK-225 is an excellent solvent for both PMMA and F-POSS, it provided an ideal mobile phase for all copolymer compositions characterized with SEC-MALLS.

TABLE 1

| F-POSS wt % (mol %) | MW (g/mol) | PDI | Conv. % | $T_g$ (° C.) | Water ($\theta_{adv}$) (degree) | Water ($\theta_{rec}$) (degree) | Hexadecane ($\theta_{adv}$) (degree) | Hexadecane ($\theta_{rec}$) (degree) |
|---|---|---|---|---|---|---|---|---|
| 0 | 58,100 | 1.08 | 73 | 127 | 77.8 ± 1.3 | 57.8 ± 2.5 | Wetted | Wetted |
| 1 (0.02) | 58,700 | 1.05 | 72 | 129 | 109.2 ± 2.4 | 61.5 ± 1.9 | 67.8 ± 1.4 | Wetted |
| 5 (0.12) | 23,00 | 1.01 | 30 | 124 | 117.8 ± 1.6 | 95.7 ± 2.9 | 76.7 ± 1.1 | 68.8 ± 1.9 |
| 10 (0.25) | 26,900 | 1.01 | 29 | 124 | 118.2 ± 1.4 | 101.1 ± 2.5 | 77.2 ± 0.4 | 69.5 ± 2.1 |
| 25 (0.79) | 37,700 | 1.03 | 41 | 125 | 120.8 ± 1.8 | 97.0 ± 2.4 | 82.9 ± 0.4 | 74.6 ± 2.0 |
| MA-F-POSS | n/a | n/a | n/a | n/a | 117.1 ± 0.6 | 93.8 ± 1.5 | 78.1 ± 0.4 | 63.0 ± 1.2 |

Example 3

Low surface energy is a desirable property for incorporation of F-POSS into copolymers. The impact of F-POSS on the surface energy of the copolymers was determined by spin casting smooth films onto silicon wafers and measuring the advancing ($\theta_{adv}$) and receding ($\theta_{rec}$) contact angles for both water and hexadecane (Table 1). More specifically, polymer films were prepared by spin casting copolymer solutions in Asahiklin-225 (10 mg/mL) on oxygen plasma treated $SiO_2$ wafers at 900 rpm for 30 sec. Films were subsequently dried under vacuum for 24 hr at 100° C. Dynamic contact angles experiments were conducted on an OCA20 goniometer (Data Physics, Co., San Jose, Calif.). Experiments consisted of placing a 3 μL drop of probing liquid onto a test substrate, adding an additional 2 μL through a dispensing needle at a rate of 0.2 μmL/sec, and then removing 3 μL at 0.2 μL. Consecutive frames (20-100) of experiment video during the addition and removal of probing liquid, where constant advancement or recession of the contact line was observed, were used to measure the advancing and receding contact angles, respectively. Measurements were made from a "tangent lean" fit using Dataphysics droplet fitting software.

FIGS. 11A-11D are Atomic Force Microscopy ("AFM") images of spun cast films of 1 wt % (FIG. 11A), 5 wt % (FIG.

11B), 10 wt % (FIG. 11C) and 25 wt % (FIG. 11D) of the F-POSS copolymer on the silicon wafer after thermal annealing (with the resolution being such that the z-scale ranges from 0 nm to 10 nm). All AFM images were processed using Gwyddion software package. Surface roughness measurements and height images were taken on a Nanoscope IV (Digital Instruments, Inc., Tonawanda, N.Y.) and was found to slightly increase with F-POSS content (rms of 0.43 nm, 0.85 nm, 1.26 nm, and 2.07 nm, respectively). In previous work, polymer blends with PMMA, F-POSS compounds were observed to bloom to the surface, rendering the surface hydrophobic/oleophobic. The AFM images of FIG. 11A-11D demonstrate that the treated surfaces exhibited crystalline features of F-POSS, which were said to be a contributing factor to the non-wetting properties of these surfaces. Similar blooming behavior was seen after thermal annealing. The lowest F-POSS composition displays small, disperse features at the surface and these features increase in size and number with increasing F-POSS concentration.

The contact angles for both water and hexadecane increased relative to neat PMMA. Hexadecane was found to wet neat PMMA and 1 wt % F-POSS composition films. However, these surfaces became more oleophobic with low contact angle hysteresis once F-POSS compositions reached 5 wt %. This low contact angle hysteresis (difference between advancing and receding contact angles) is vital for the production of non-wetting surfaces. The contact angle hysteresis was lower (that is 8°) for the highest copolymer composition (25 wt % F-POSS), as compared to pure monomer MA-F-POSS at 15°. The difference in contact angle was attributed to the increased fluorine content provided by F-POSS along the polymer backbone and on the surface. Hydrophobicity for the coated surfaces increased with F-POSS composition. From these measurements, only a 5 wt % of F-POSS was sufficient to obtain low surface energy properties. Both $\theta_{adv}$ and $\theta_{rec}$ of F-POSS copolymer composition increased, which was similar to blended polymers from previously published work.

FIGS. 12A and 12C illustrate static contact angles of a water droplet on silicon wafer surfaces have 0 wt % F-POSS copolymer and 25 wt % F-POSS copolymer, respectively. These same solutions were used to coat cotton fabrics to demonstrate the surface enhancing properties of the F-POSS copolymers. The 25 wt % F-POSS coated fabric was both superhydrophobic and oleophobic. Surface texture of the fabric samples helped ensure superhydrophobic and oleophobic behavior.

Example 4

Figure 13:
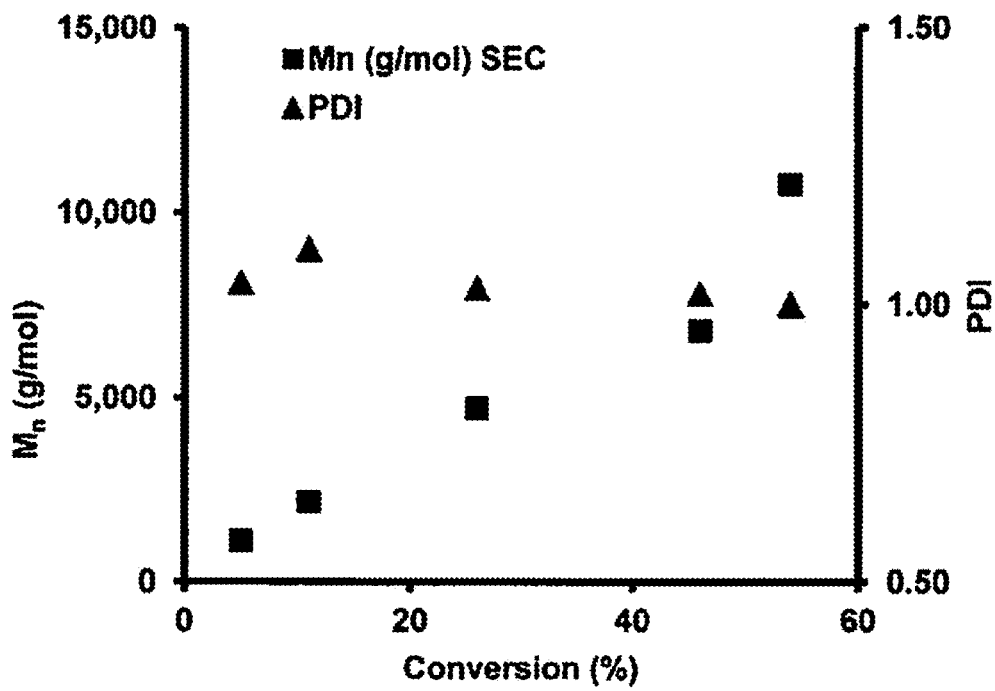
FIG. 13 is a graphical representation of exemplary data from a comparison of molecular weight/PDI versus monomer conversion.

FIG. 13 illustrates molecular weight/PDI versus percent conversion for RAFT polymerization of MMA in $C_6F_6$. SEC-MALS measurements were performed in THF.

Example 5

Figure 14:
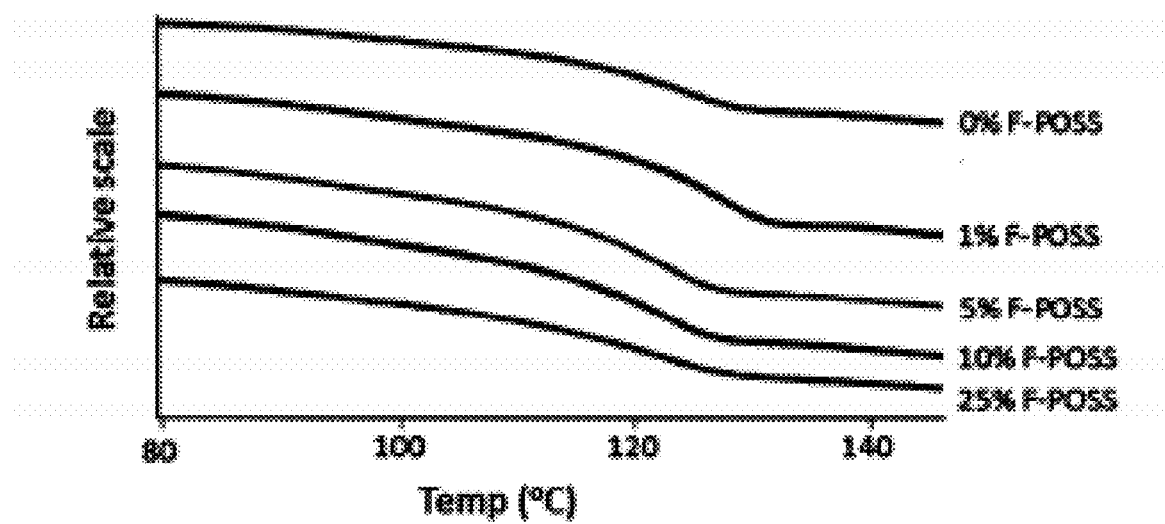
FIG. 14 illustrates DSC traces of various concentrations of F-POSS copolymers.

FIG. 14 shows zoomed in DSC traces of F-POSS copolymers. The reported $T_g$ values are 127° C., 129° C., 124° C., 125° C., and 124° C. for 0 wt %, 1 wt %, 5 wt %, 10 wt %, and 25 wt %, respectively. The second heat cycles is shown with corresponding heating rate of 10° C./min.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A long-chain fluoroalkyl polyhedral oligomeric silsesquioxane polymer comprising a structure:

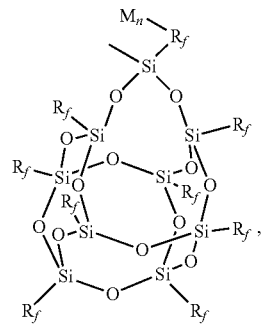

wherein $R_f$ is —CH$_2$CH$_2$(CF$_2$)$_7$CF$_3$;
$R_1$ represents a linking group; and
$M_n$ represents a polymer, wherein the polymer has n units of monomer, M, and n is greater than 1.

2. The long-chain fluoroalkyl polyhedral oligomeric silsesquioxane of claim 1, wherein the polymer comprises n units norbornene triethylene glycol (2-[2-(2-hydroxyethoxy) ethoxy]ethanol), cyclooctene, cyclopentene, cyclobutene, or cyclooctadiene.

3. The long-chain fluoroalkyl polyhedral oligomeric silsesquioxane of claim 1, wherein the polymer is a co-polymer.

4. A long-chain fluoroalkyl polyhedral oligomeric silsesquioxane polymer comprising:
a polyhedral oligomeric silsesquioxane cage having one D type silicon atom;
at least six fluoroalkyl arms comprising —CH$_2$CH$_2$(CF$_2$)$_7$CF$_3$ coupled to the polyhedral oligomeric silsesquioxane cage; and
a polymer coupled to the polyhedral oligomeric silsesquioxane cage via the one D type silicon atom.

5. The long-chain fluoroalkyl polyhedral oligomeric silsesquioxane polymer according to claim 4, wherein the polymer further comprises a polymerized unit of an alkene chain derived from a cyclic alkene.

6. The long-chain fluoroalkyl polyhedral oligomeric silsesquioxane polymer according to claim 5, wherein the cyclic alkene is selected from the group consisting of cyclooctene, cyclopentene, triethylene glycol norbornene, cyclobutene, and cyclooctadiene.

7. The long-chain fluoroalkyl polyhedral oligomeric silsesquioxane polymer according to claim 4, wherein the polymer includes polymerized units of norbornene triethylene glycol.

8. A method of synthesizing the long-chain fluoroalkyl polyhedral oligomeric silsesquioxane polymer of claim 4, the method comprising:
polymerizing, via ring-opening metathesis polymerization, a stressed cyclic olefin F-POSS macromer.

9. The method of claim 8, wherein the polymer is a block polymer, the method further comprising:
introducing a first monomer while polymerizing the stressed cyclic olefin F-POSS macromer.

10. The method of claim 9, further comprising:
introducing a second monomer while polymerizing the stressed cyclic olefin F-POSS macromer.

11. The method of claim 8, further comprising:
introducing a second monomer after polymerizing the stressed cyclic olefin F-POSS macromer; and
forming a block copolymer with the first and second monomers.

12. The long-chain fluoroalkyl polyhedral oligomeric silsesquioxane polymer of claim 4, further comprising:
a linking group between the polymer and the one D type silicon atom.

* * * * *